United States Patent [19]

Muster et al.

[11] 4,157,783
[45] Jun. 12, 1979

[54] ITEM RESPONSIVE PRINT INHIBITING APPARATUS

[75] Inventors: Frank L. Muster; Henry M. Korytkowski; Frederick H. Dear, all of Rochester, N.Y.

[73] Assignee: Burroughs Corporation, Detroit, Mich.

[21] Appl. No.: 844,476

[22] Filed: Oct. 21, 1977

[51] Int. Cl.² .................. G06F 15/30; G06K 9/00; G06K 3/00; G06K 19/06
[52] U.S. Cl. ..................... 235/379; 235/475; 235/494; 340/146.3 C
[58] Field of Search ............ 235/454, 433, 437, 379, 235/375, 494, 487, 475; 250/566, 568, 569; 101/93 C; 340/146.3 C, 146.3 D, 146.3 Z; 346/75

[56] References Cited

U.S. PATENT DOCUMENTS

| | | | |
|---|---|---|---|
| 2,820,907 | 1/1958 | Silverman | 235/454 |
| 3,804,005 | 4/1974 | Burger | 235/433 |
| 3,949,363 | 4/1976 | Holm | 235/437 |
| 4,027,142 | 5/1977 | Paup | 235/487 |

Primary Examiner—Robert M. Kilgore
Attorney, Agent, or Firm—Gerald J. Woloson; Robert J. Gaybrick; Edward J. Feeney, Jr.

[57] ABSTRACT

In a modular high speed document printing system an apparatus within each printing module for inhibiting printing on a document passing therethrough when a valid print inhibiting code is sensed on the document. The apparatus employs a document lead edge sensor for sensing the presence of a document within the printing module and a print inhibiting code sensor for scanning preselected portions of a document for a print inhibiting code. A timing means is responsively coupled to the lead edge sensor for defining a time interval corresponding to the time interval wherein a valid print inhibiting code may be found. A retriggerable counter is responsively coupled to the print inhibiting code sensor for initiating counting in a memory means upon the sensing of a possible print inhibiting code. Means are provided for determining from the outputs of the counter and the timing mechanism whether a code sensed by the print inhibiting code sensor is a valid print inhibiting code.

10 Claims, 5 Drawing Figures

4,157,783

ITEM RESPONSIVE PRINT INHIBITING APPARATUS

FIELD OF THE INVENTION

The invention relates to an apparatus for use within a modular document printing system wherein printing by any module upon a document is controlled by the presence or absence of a printing inhibiting code on the document.

BACKGROUND OF THE INVENTION

The disclosed apparatus relates with particularity to Ser. No. 844,520 filed on even date herewith and is assigned to the common assignee and the disclosure thereof is hereby incorporated by reference. The incorporated subject matter sets forth a modular document printing system which comprises a document feeder module, one or more document printing modules and a document receiver module coupled together to form an integrated printing system. The document printing modules include print heads which can print sequential numeric information, constant numeric information and alphanumeric information. The printing can be performed in machine readable form and each of the printing modules prints in a preselected location on a document passing therethrough. A large number of different printing formats is attainable by assembling a plurality of printing modules of different types.

The instant apparatus can be incorporated into each of the printing modules such that a determination to print on a document or inhibit printing on a document can be made according to the presence or absence of a recognizable code on the document. An example of an application of the instant apparatus within the modular document printing system is where a succession of a first type of document is being consecutively numbered by a printing module. If, within the succession, it is required to intersperse one or more of a second type of document which is not to be sequentially numbered, it is merely required that these interspersed documents be provided with a recognizable print inhibit code so that the consecutive numbering printing module will not print on these documents. This permits more of the first type of document to follow the interspersed documents without interruption of the numerical sequence. It can be seen that providing such a print inhibiting apparatus within each printing module enables the modular document printing system to be more flexible in its application.

SUMMARY OF THE INVENTION

It is an object of this invention to provide a document responsive print-inhibiting apparatus for use in a modular document printing system.

It is another object of this invention to provide a document responsive print inhibiting apparatus for use in a modular document printing system which is capable of distinguishing between valid and invalid print inhibiting codes.

A further object of this invention is to provide a print inhibiting apparatus for use in modular document printing system which enables printing of a succession of sequentially numbered documents which includes interspersed nonsequentially numbered documents.

It is still another object of this invention to provide a print inhibiting apparatus within a modular document printing system to enable variable formats of information to be selected for printing.

These and other objects are accomplished by a print inhibiting apparatus for use within each printing module of a modular document printing system. The print inhibiting apparatus employs a document lead edge sensor signal to establish a first time interval or code window wherein it is valid to sense a print inhibiting code on a document. A sensor is provided to simultaneously scan the document for the presence of a print inhibiting code and to initiate a second time interval upon sensing such a code. Correlation means are coupled to the first time interval establishing means and the second time interval establishing means to determine whether the second time interval occurs within the window and is equal to or greater in duration than the duration of a selected sub-interval of the first time interval. The correlation apparatus permits or inhibits printing by a printing module depending upon the determined validity of the scanned print inhibiting code.

BRIEF DESCRIPTION OF THE DRAWINGS

The novel features which are characteristic of this invention are set forth with particularity in the appended claims. The invention itself, however, both in its organization and method of operation together with further objects and advantages thereof may best be understood with reference to the following description when considered in conjunction with the accompanying drawings:

DESCRIPTION OF THE PREFERRED EMBODIMENT

Figure 1:
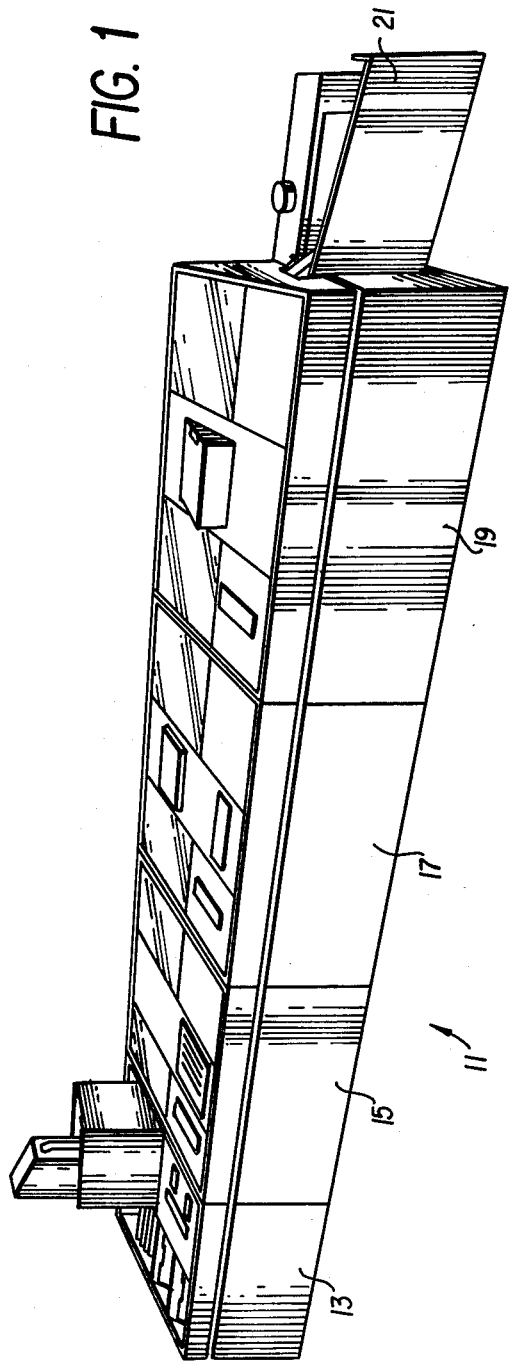
FIG. 1 is a perspective view of the modular printing system wherein the instant apparatus for inhibiting printing is employed.

FIG. 1 shows a perspective view of a modular document printing system which can advantageously employ the apparatus of the instant invention. The printing system 11 is shown to comprise a feeder module 13 and printing modules 15, 17 and 19 coupled together with receiver 21 to form an integrated high-speed modular document printing system. Each of the printing modules 15, 17 and 19 can employ a print inhibit apparatus as will be subsequently disclosed.

Figure 2:
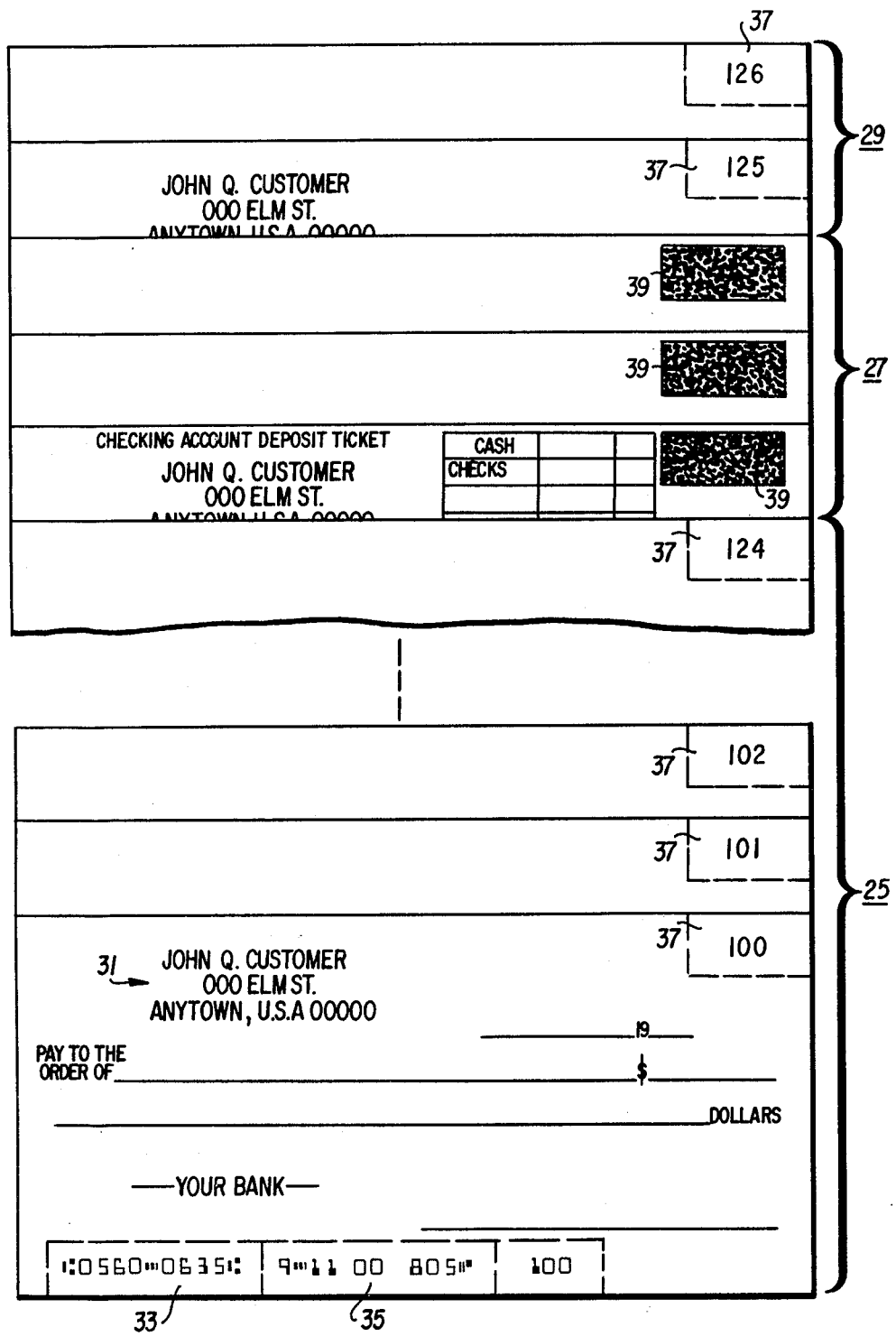
FIG. 2 shows examples of documents printed by an apparatus which employs the apparatus of the instant invention.

In FIG. 2 there are exhibited two types of documents commonly employed by consumers. The documents 25 comprise standard bank checks as do the documents 29. The documents 27 are deposit tickets which are normally found together with bank checks. The normal method of preparing these documents includes providing blank checks and deposit tickets which are to be printed with selected information by the printing system. Normally, lifts of twenty-five checks are assembled with deposit slips provided behind each lift. The checks are to be sequentially numbered whereas no numbers are to be printed on the deposit slips. Since the two types of documents are interspersed a problem arises in maintaining the proper sequence in printing the check number on the checks.

It can be readily seen that the bank checks 25, 29 and the deposit tickets 27 share common fields, i.e. the customer's name and address, account number, and routing and transit fields. As is set forth in the previously identified copending patent application, the modular high-speed document printing apparatus disclosed therein can be employed to print bank checks and deposit tickets as shown in FIG. 2. This is accomplished by providing a printing module to print various preselected fields on the face of document blanks to thereby customize the documents with the information specifically relating to a particular customer. As can be seen from FIG. 2 these fields would include the customer name and address field 31, the bank ID field 33, and the customer account number field 35. The copending application discloses apparatus for printing each of these fields. The bank checks depicted in FIG. 2 also contain check number fields 37 wherein the checks are consecutively numbered from any preselected beginning number to a preselected ending number. If, as has been discussed, it is desired to print both bank checks and deposit tickets in such a manner that they can be automatically assembled into books or pads it is necessary to intersperse deposit tickets 27 into sequentially numbered successions or lifts of bank checks 25 and 29. The instant apparatus for inhibiting printing is employed within the printing modules to enable such an interspersing of document types. Each of the deposit tickets 27 contains a field 39 proximate the upper right-hand corner of the document which can be sensed by the print inhibiting apparatus within each printing module to inhibit printing of the sequential field on the document. It should be readily understood that the same code fields 39 could be employed in different applications to inhibit the other or all printing on the documents and that the only restrictions on the location of the code fields 39, or black spots as they are commonly called, is that they appear within the scan of the black spot sensor and that they appear before the location on the document at which a particular module is to print.

Figure 3:
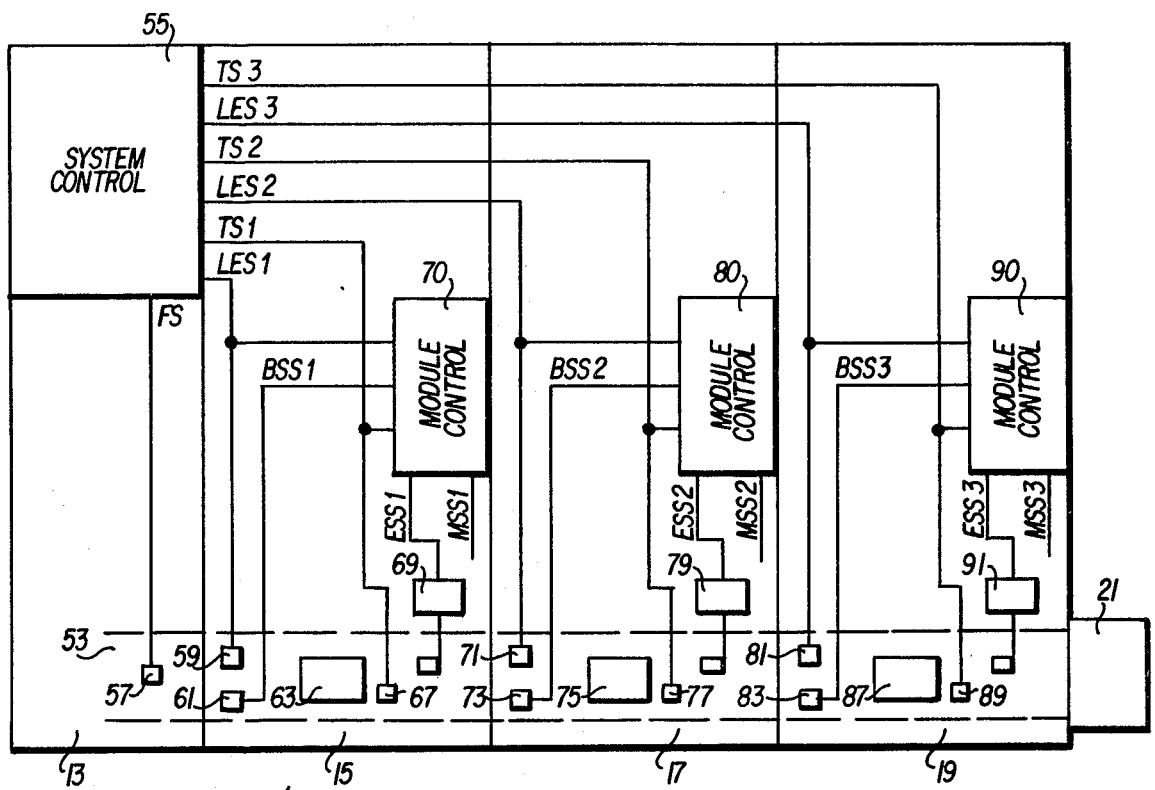
FIG. 3 shows a schematic embodiment of the modular document printing system within which the instant print inhibit apparatus can be employed.

FIG. 3 shows a schematic of the modular document printing system and shows the document feeder module 13, printing modules 15, 17, 19 and the receiver module 21. The dashed portion shows the document path 53 from the feeder module through each of the printing modules to the document receiver hopper 21. Within the feeder module 13 is the system control 55 for the modular document printing system as well as a feed sensor 57 coupled to the system control 55. The feed sensor could, for example, be a solid state detector which includes in a single housing a phototransistor and a light emitting diode. The diode and phototransistor are angularly related such that light from the diode would be reflected to the phototransistor when an article or document in the document path 53 passes the sensor 57. The reflection of light to the phototransistor on the surface of the article results in the propagation of a feed sensor pulse FS from the feed sensor 57 to the system control 55. The feed sensor 57 could, however, be any type of sensor, including a magnetic sensor, depending upon the type of article or document which is being printed by the system.

A document passing from the feeder module 13 is received by the first printing module 15. The printing module 15 includes a lead edge sensor 59 and a skip or black spot sensor 61 in such positions that they will sense the passage of a document in the document path 53. The lead edge sensor 59 and black spot sensor 61 can be optical sensors of the type employed within the feeder module, and as was the case for the feed sensor 57 it is felt that one skilled in the art would be able to provide a lead edge sensor for generating a signal in response to the passage of an article and a skip sensor for generating a signal when a document is passing therethrough and for inhibiting an output signal when a black spot is sensed on the document. The lead edge sensor pulse LES1 for the for the first printing module is supplied to the system control 53 as well as to the module control 70 of the first printing module 15. The black spot sensor 61 is aligned with the lead edge sensor 59 within document path 53 and the black spot sensor 61 is actuated by the module control 70 upon the module control receiving a signal from the lead edge sensor 59 indicating the presence of a document. The black spot sensor 61 normally generates an output signal when scanning the document due to the reflection of light from the diode onto the phototransistor. When a black spot such as code 39 (FIG. 2) is scanned the output signal goes low for the duration of the black spot. The absence of a lead edge sensor signal will cause the module control 70 to deactivate the black spot sensor 61.

After a document passes the lead edge sensor 59 and the black spot sensor 61 it is conveyed through the document path 53 to the document platen 63, trip sensor 67 and the end stop 69. The incorporated patent application discloses the interaction between these elements to normally result in printing on the document.

Printing module 17 receives the document from printing module 15 and module 17 also includes a lead edge sensor 71 and a black spot sensor 73 located within document path 53. The lead edge sensor 71 generates an output signal LES2 which is supplied to both the system control 55 and the module control 80 whenever a document is passing sensor 71. The black spot sensor 73 scans the document for a black spot or print inhibiting code in the same manner as did black spot sensor 61 in module 15. It is important to note, however, that a black spot sensor is only provided or, alternatively, is only actuated within those printing modules which are not to print upon documents which have a valid black spot or print inhibiting code. If printing module 17 is equipped with a black spot sensor 73 as shown but no black spot is sensed on the document, then LES2 is propagated to module control 80 which in turn signals end stop 79 to rotate into a blocking position within document path 53 such that a document is stopped in a position over the platen 75. Printing is performed as set forth in the referenced patent application and the document released to travel within document path 53 to printing module 19.

Printing module 19 includes lead edge sensor 81 and skip sensor 83 for operation in the same manner as their counterparts within modules 15 and 17 and further explanation is felt not to be required. Finally, receiver 21 is provided to receive the fully processed documents from the final printing module.

Figure 4:
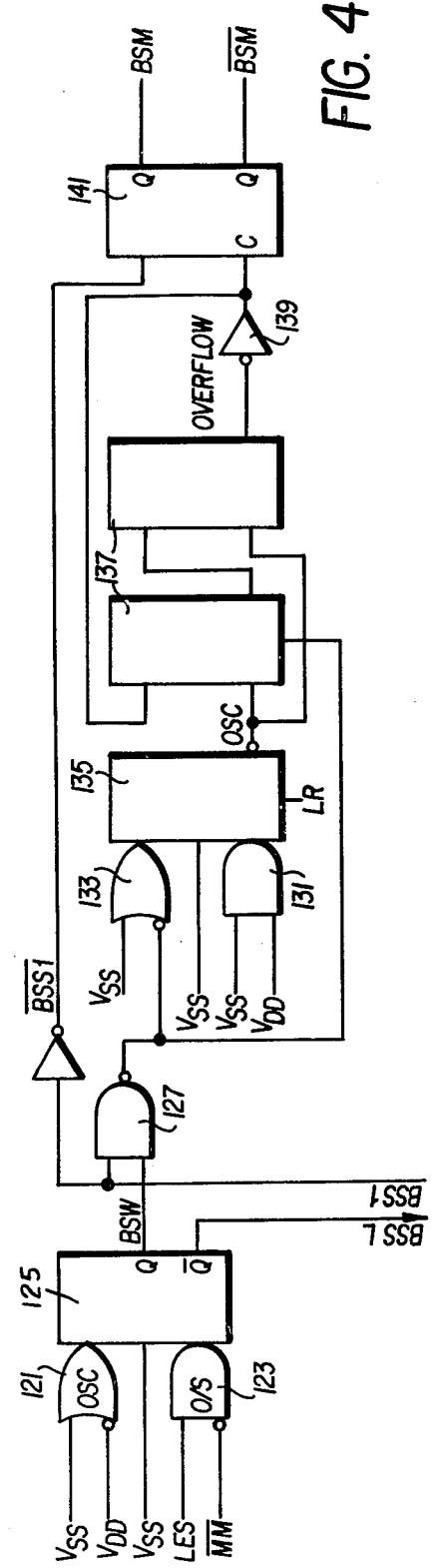
FIG. 4 exhibits an organization of logical devices which comprise an embodiment of the instant invention.

FIG. 4 exhibits an embodiment of the instant apparatus for inhibiting printing on documents upon the sensing of a valid print inhibiting code. The apparatus in FIG. 4 is employed to determine whether a code which may be sensed be one of the skip or black spot sensors is a valid print inhibiting code. In FIG. 4 OR gate 121 and one-shot 123 are combined with logical device 125 to form a precision one-shot which produces a black spot window BSW pulse of selected duration whenever the one-shot is triggered by a LES pulse. The BSW pulse is supplied to NAND gate 127 which has as its other input a signal from the skip or black spot sensor within a printing module. The skip or black spot sensor signal BSS1 is normally high but goes low whenever a black spot is sensed. BSS1 is supplied to the NAND gate 127 such that the output of the NAND gate is low whenever a BSW pulse and a BSS1 pulse are simultaneously present on input. The NAND gate 127 is coupled to a retriggerable oscillator 135 through OR gate 133. The output of the NAND gate 127 is inverted on input to the OR gate 133 and serves to trigger the oscillator 135. The oscillator supplies pulses OSC at a preselected pulse rate to the shift registers 137 such that an input is shifted through the shift registers 137 by the OSC pulses. If the shift registers 137 overflow, an output is supplied through inverter 139 to flip-flop 141. If the flip-flop 141 has previously received a BSS1 signal, the reception on input of an overflow pulse will trigger the Q output and signals that a valid black spot or print inhibiting code has been sensed by the skip or black spot sensors.

Figure 5:
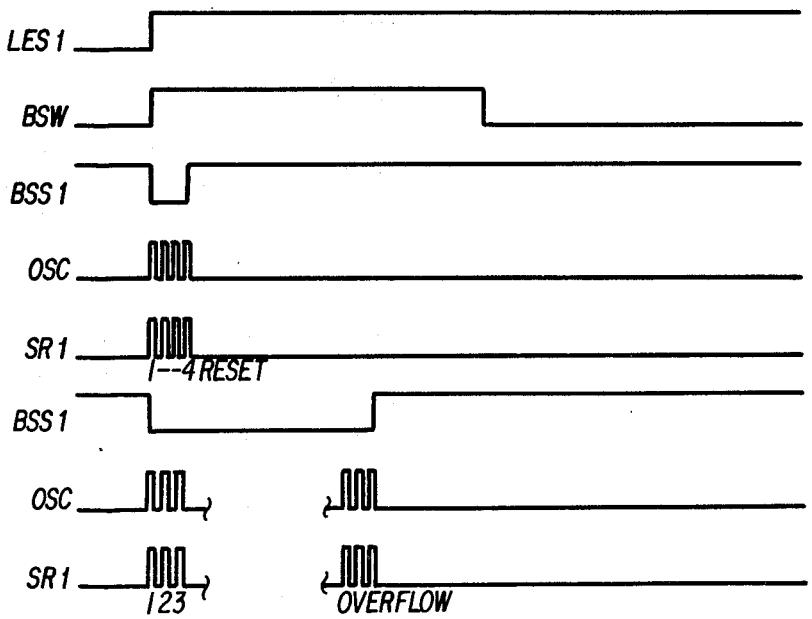
FIG. 5 is a timing diagram to be read in conjunction with FIG. 4.

The operation of the apparatus shown in FIG. 4 is more readily understood when the timing diagram of FIG. 5 is read in conjunction with the apparatus shown in FIG. 4. To refer back to the sample document shown in FIG. 2 it can be seen that the documents all have a narrow black band along the right hand or leading edge. In the case of the documents 25 and 29 this black band should not be recognized as a valid print inhibiting code whereas in the documents 27 the black spot or print inhibiting codes 39 should be recognized as valid print inhibiting codes. When the leading edge of a document hits the lead edge sensor within a printing module, for example printing module 1, a LES1 pulse is generated and supplied to the one-shot 123. Assuming that the other inputs to the oscillator 121 and one-shot 123 have been appropriately supplied, a BSW or black spot window pulse is generated as shown in FIG. 5. This BSW pulse is high for a predetermined period such as the length of time it takes for one-half of the document to pass by the lead edge sensor and the skip sensor. In the case of a document 25, the skip sensor will inhibit an output BSS1 for a period corresponding in duration to the length of time it takes the narrow black band adjacent to the leading edge of a document to pass the skip sensor. This is reflected in the first BSS1 pulse shown in the timing diagram of FIG. 5. As was previously explained, the BSS1 pulse is coupled to NAND gate 127 with a BSW pulse and an output is generated to OR gate 133 which starts the oscillating pulses from the enable oscillator 135. Since the black band is quite narrow the low BSS1 pulse would be of short duration and very few OSC pulses would be generated and thus the shift registers 137 will be shifted a very few positions and will not overflow. When the BSS1 pulse goes back high signaling the end of the black spot the shift registers 137 are automatically reset by the output of NAND gate 127 also going high. It can be seen that a mark on a document will not be recognized as a valid print inhibiting code if the skip sensor does not generate a signal of sufficient duration to cause the shift registers to be clocked to the point of overflow.

When a document such as 27 is presented to a printing module it is, of course, desired not to print the sequential field 37. The documents 27 have elongated print inhibiting codes 39 which are also referred to as black spots. Referring to the timing diagram in FIG. 5, when the document encounters the lead edge sensor in the first module, an LES1 pulse is generated and also a black spot window. In this case, however, the skip sensor or black spot sensor will generate a low BSS1 signal which is proportionally equal in length to the length of the black spot 39 on the document 27. This causes the oscillator to generate far more pulses than in the previously described case and indeed, it can be seen that the pulses clock the shift registers to the point of overflow. The overflow pulse is inverted and supplied the flip-flop 141 and a BSM or black spot memory pulse is generated to indicate that a valid print inhibiting code has been sensed by the skip sensor and that this particular document is to be passed through the printing module without being printed upon.

To summarize the operation of the disclosed apparatus in more general terms, it can be seen that the apparatus generates a black spot window which is initiated by the lead edge of a document passing the lead edge sensor and corresponds to a time period within which the apparatus will scan for a valid print inhibiting code. The length of the black spot window can be selected at any value desired and could correspond to the passage of a quarter, one-half or in fact the entire document past the lead edge sensor. When a black spot window has been initiated, the apparatus becomes responsive to a signal from the black spot sensor. A valid print inhibiting code corresponds to a signal from the black spot sensor of a particular duration or sub-interval of the duration of the black spot window. Again, the duration of a code which can be identified as a valid print inhibiting code can be selected by the number of pulses which it takes to overflow the shift registers or by the pulse rate of the clocking oscillator. It can be seen that it is not necessary that the black spot or print inhibiting code start with the lead edge of the document but only that it be within the portion of the document which corresponds to a black spot window and be of a preselected duration. The apparatus is able to distinguish between valid print inhibiting codes and invalid print inhibiting codes and in the instance of valid print inhibiting codes, stops the module from printing upon the documents.

The foregoing description of an item responsive print inhibiting apparatus is intended to be explanatory of an apparatus which can make determinations of whether a printing module which incorporates the apparatus is to print on a document which is presented to the module. It will be understood from the foregoing that various changes may be made in the preferred embodiment as illustrated here, and it is intended that the foregoing material be taken as illustrative only, and not in a limiting sense and that the scope of the invention is defined by the following claims.

We claim:

1. In a printing module of a modular document printing system which operates on a stream of documents fed through the module at a substantially constant rate, an apparatus for scanning the document stream for a print inhibit code on individual documents and for inhibiting printing on a document by said module in response thereto, the apparatus comprising:

document sensing means in said module for sensing the lead edge of a document;

means coupled to said document sensing means for initiating a window interval of a first preselected duration in response to the sensing of a document lead edge;

document scanning means in said module, activated by the sensing of a lead edge of a document, for sensing indicia on said document during the duration of said window interval and for generating an output signal in response to the sensing of indicia on said document, the duration of said output signal being a function of both the width of said indicia and said stream feed rate;

means coupled to said document scanning means for initiating a validation signal in response to said output signal; and means for generating a print inhibit signal for inhibiting printing on said document by said module when the duration of said validation signal is equal to or greater than a second preselected time interval.

2. The apparatus of claim 1 wherein said means for initiating said window interval comprises a retriggerable one-shot.

3. The apparatus of claim 2 wherein said means for initiating said validation signal comprises an oscillator means for generating a sequence of counting pulses.

4. The apparatus of claim 3 wherein said means for generating a print inhibit signal comprises shift register means advanced by said sequence of counting pulses whereby a print inhibit signal is generated by said shift register means being advanced to overflow.

5. A print inhibit apparatus for use in a printing module of a modular document printing system which operates on a stream of documents fed through the module at a substantially constant rate, said apparatus for inhibiting printing on a document by the module in response to the sensing of a valid print inhibit code on the document, the apparatus comprising:

document sensing means in said module for sensing the lead edge of a document;

document scanning means for sensing indicia on said document;

means activating said scanning means for a first preselected time period for enabling said scanning means to generate an output signal upon the sensing of indicia and to maintain said output signal for the duration of said indicia, the duration of said output signal being a function of both the width of said indicia and said stream feed rate;

means receiving said output signal for establishing a validation signal with a duration equal to the duration of said output signal; and print inhibit code validity checking means for generating a print inhibit signal for said module when the duration of said validation signal is equal to or greater than a second preselected time interval.

6. The print inhibit apparatus of claim 5 wherein said means activating said scanning means comprises a retriggerable one-shot, said retriggerable one-shot being retriggered by the sensing of the lead edge of a document.

7. The print inhibit apparatus of claim 6 wherein said means for establishing said validation signal comprises:

actuatable oscillator means for generating a series of counting pulses;

means for actuating said oscillator means; and shift register means, of preselected storage capacity, advanced by said counting pulses, for generating an overflow signal when said output signal is equal to or greater than said second preselected time interval.

8. A circuit for use in a module of a modular printing system which operates on a stream of documents fed through the module at a substantially constant rate, said circuit for inhibiting printing on a document by said module in response to the sensing of a print inhibit code on said document, said circuit comprising:

document sensing means in said module for sensing the lead edge of a document;

a one-shot triggered by said document sensing means upon the sensing of a lead edge for establishing a document scanning time interval of preselected duration;

document scanning means enabled by said one-shot for the duration of said preselected document scanning time interval, said scanning means for sensing indicia on said document and for generating an output signal upon the sensing of said indicia and for maintaining said output signal for the duration of the time during which said indicia is sensed, the duration of said output signal being a function of both the width of said indicia and said stream feed rate;

oscillator means for generating counting pulses during the duration of said output signal;

means receiving said counting pulses for generating a print inhibit signal if the number of counting pulses received is equal to or greater than a preselected number.

9. The circuit of claim 8 wherein said means for generating a print inhibit signal comprises shift register means having a preselected number of storage positions, said shift register means advanced by said counting pulses such that said shift register means overflows and generates said print inhibit signal when the number of counting pulses received is greater than the preselected number of storage positions in said shift register means.

10. A method for use in each module of a modular printing system which operates on a stream of documents fed through the module at a substantially constant rate, said method for determining the validity of a print inhibit code on a document and for inhibiting printing on the document by the printing module in response to a valid print inhibiting code, the method comprising the steps of:

sensing the lead edge of a document as it enters a printing module;

establishing a time interval of a first preselected duration in response to the sensing of said lead edge, said time interval for scanning a document for a print inhibit code;

initiating scanning of a document for a print inhibit code in response to the sensing of a document lead edge;

generating an output signal in response to the sensing of indicia during the scanning of said document and maintaining said output signal for the duration that said indicia is sensed, the duration of said output signal being a function of both the width of said indicia and said stream feed rate;

initiating a validation signal with a duration equal to the duration of said output signal; and generating a print inhibit signal if the duration of said validation signal is equal to or greater than a second preselected time interval.

* * * * *